United States Patent [19]

Sekiya et al.

[11] Patent Number: 4,870,490
[45] Date of Patent: Sep. 26, 1989

[54] TELEVISION RECEIVER

[75] Inventors: Hiroshi Sekiya, Kamakura; Ikuya Arai, Yokohama; Toshinori Murata, Yokohama, all of Japan

[73] Assignees: Hitachi, Ltd.; Hitachi Video Engineering, Incorp., Tokyo, Japan

[21] Appl. No.: 248,375

[22] Filed: Sep. 23, 1988

[30] Foreign Application Priority Data

Sep. 30, 1987 [JP] Japan .................. 62-243736

[51] Int. Cl.[4] .................. H04N 5/04; H04N 5/68
[52] U.S. Cl. .................. 358/158; 358/242; 315/387
[58] Field of Search .............. 358/188, 158, 242, 243; 331/20; 315/387

[56] References Cited

U.S. PATENT DOCUMENTS

| | | | |
|---|---|---|---|
| 3,821,470 | 6/1974 | Merrell | 358/159 |
| 4,096,328 | 6/1978 | Tüma et al. | 358/158 |
| 4,245,251 | 11/1981 | Steckler et al. | 358/158 |
| 4,520,394 | 5/1985 | Kaneko | 358/158 |
| 4,591,910 | 5/1986 | Lai et al. | 358/158 |
| 4,636,861 | 1/1987 | Willis | 358/158 |
| 4,729,024 | 3/1988 | Kawai et al. | 358/158 |
| 4,754,330 | 6/1988 | Spieth | 358/158 |
| 4,769,705 | 9/1988 | Lendaro | 358/158 |
| 4,791,488 | 12/1988 | Fukazawa et al. | 358/158 |

FOREIGN PATENT DOCUMENTS

62-81177  4/1987  Japan .

Primary Examiner—John K. Peng
Attorney, Agent, or Firm—Antonelli, Terry & Wands

[57] ABSTRACT

In a television receiver including a digital circuit processing an input video signal in a digital mode, a clock generating circuit applies a system clock signal to the digital circuit, and comprises a phase comparator to which a horizontal synchronizing signal is applied, a low-pass filter connected to the phase comparator, a voltage controlled oscillator connected to the low-pass filter to generate the system clock signal, a first frequency divider dividing the frequency of the system clock signal generated from the voltage controlled oscillator to generate a horizontal deflection drive pulse signal, and a second frequency divider connected to the phase comparator. The phase comparator, the low-pass filter, the voltage controlled oscillator, the first frequency divider and the second frequency divider constitute a single PLL circuit, and the system clock signal and the horizontal deflection drive pulse signal are respectively generated from the PLL circuit.

3 Claims, 5 Drawing Sheets

TELEVISION RECEIVER

BACKGROUND OF THE INVENTION

This invention relates to a television receiver in which an input video signal is processed in a digital signal processing circuit, and an electron beam is scanned at a frequency which is n times (n being an integer) as high as that of a horizontal synchronizing signal of the video signal. More particularly, this invention relates to a clock generating circuit for use in such a television receiver to generate a system clock signal synchronized with the horizontal synchronizing signal of the input video signal.

Standard television signals employed in Japan are based on the NTSC system, and there is the following relation between the frequency $f_{sc}$ of a color subcarrier and the frequency fH of a horizontal synchronizing signal:

$$f_{sc} = 455/2 \cdot f_H \ldots \quad (1)$$

Therefore, when a system clock signal synchronized with the color subcarrier having the frequency $f_{sc}$ is used during digital signal processing of a video signal, the color signal can be conveniently demodulated. However, the relation specified in the equation (1) is not always satisfied in outputs of all of modern video apparatus. Thus, when a system clock signal synchronized with the color subcarrier is used for the purpose of digital signal processing of video signals generated as outputs from those video apparatus which do not satisfy the above relation, it is difficult to easily reproduce the horizontal synchronizing signal, and a circuit arrangement of complex structure is required. Also, because the points of sampling differ in the horizontal direction for each of individual lines, reduction of noise as by a noise reducer cannot be expected. Therefore, a system clock signal synchronized with the horizontal synchronizing signal is preferably used for the purpose of digital signal processing of the video signal outputs from those video apparatus. Also, the use of the system clock signal synchronized with the horizontal synchronizing signal is preferable in that the speed conversion of the video signal can be facilitated, and scanning at a multiple density can be made.

Figure 2A:
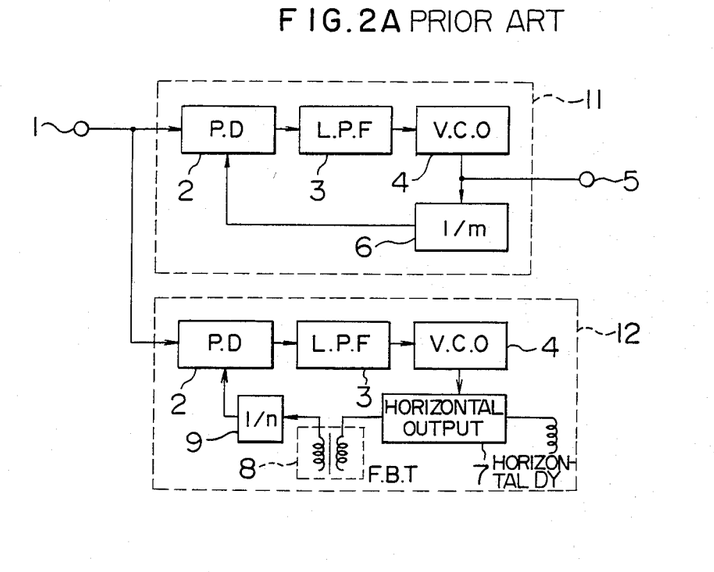
FIGS. 2A and 2B are block diagrams of synchronizing circuits used in prior art television receivers, respectively.
Figure 2B:
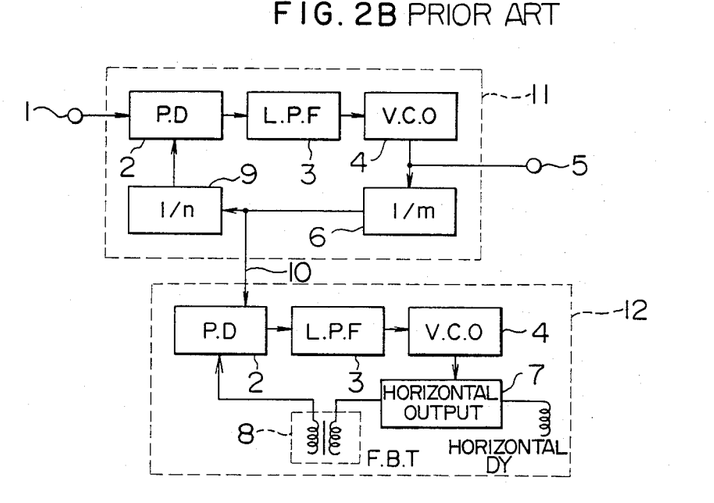

FIGS. 2A and 2B are block diagrams of prior art synchronizing circuits respectively exployed for generating such a synchronizing signal in a television receiver. In each of FIGS. 2A and 2B, the reference numerals 1, 2, 3, 4, 5, 6, 7, 8, 9, 10, 11 and 12 designate a horizontal synchronizing signal input terminal, a phase comparator (PD), a low-pass filter (LPF), a voltage controlled oscillator (VCO), a system clock output terminal, a 1/m frequency divider, a horizontal output circuit, a flyback transformer (FBT), a 1/n frequency divider, a synchronizing signal, a clock generating circuit, and a horizontal deflection circuit, respectively.

Referring to FIG. 2A, in response to the application of a horizontal synchronizing signal having a frequency $f_H$ to the horizontal synchronizing signal input terminal 1, the clock generating circuit 11 generates a system clock signal having a frequency $m \times f_H$, and such a clock signal appears at the system clock output terminal 5. Also, in response to the application of the horizontal synchronizing signal to the horizontal deflection circuit 12, the horizontal output circuit 7 generates a horizontal deflection pulse signal to drive a horizontal DY. As described above, the system clock signal and the horizontal deflection pulse signal are independently synchronized with the horizontal synchronizing signal and generated in parallel with each other.

Referring to FIG. 2B, in response to the application of a horizontal synchronizing signal having a frequency $f_H$ to the horizontal synchronizing signal input terminal 1, the clock generating circuit 11 generates a system clock signal which appears at the system clock output terminal 5. By dividing the frequency of the system clock signal by the factor of m by the 1/m frequency divider 6, a horizontal synchronizing signal 10 having a scanning frequency $2 \times f_H$ is obtained and applied to the horizontal deflection circuit 12. In the horizontal deflection circuit 12, the horizontal output circuit 7 generates a horizontal deflection pulse signal synchronous with this synchronizing signal 10 to drive a horizontal DY. Thus, in the form shown in FIG. 2B, two PLL circuits are connected in series with each other.

As prior art systems related to the circuit arrangements shown in FIGS. 2A and 2B, those disclosed in, for example, JP-A-62-81177 and U.S. Pat. No. 4,636,861 are referenced.

However, the manners of system clock generation and horizontal deflection by the prior art circuits described above have frequently given rise to such a problem that, when an input video signal including skew or jitter is applied to a television receiver, jitter occurs on a scene being displayed, or skew is emphasized on a scene being reproduced. The reasons will be described with reference to FIGS. 3A and 3B which show step responses of the clock generating circuit 11 and horizontal deflection circuit 12 shown in each of FIGS. 2A and 2B when a phase error is present. That is, each of FIGS. 3A and 3B shows the response of the output relative to the input when a phase difference $\phi$ occurs at time t=0.

Figure 3A:
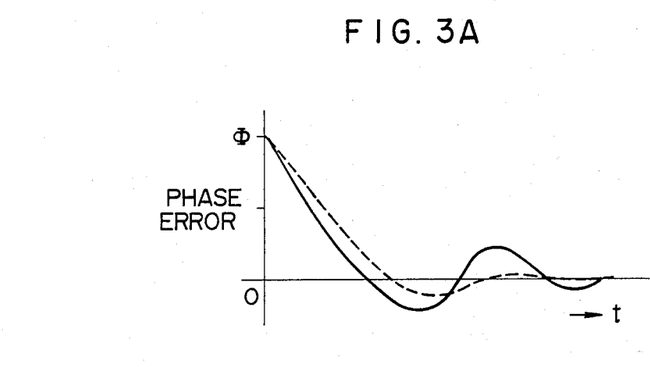
FIGS. 3A and 3B show step responses of the prior art synchronizing circuits shown in FIGS. 2A and 2B in the presence of a phase error, respectively.
Figure 3B:
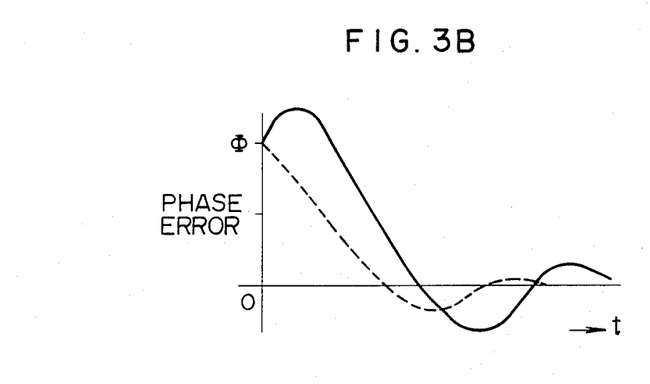

The case shown in FIG. 3A will be first discussed. Suppose that the step response of the clock generating circuit 11 of FIG. 2A in the presence of a phase error is represented by a solid characteristic curve as shown in FIG. 3A, while that of the horizontal deflection circuit 12 of FIG. 2A in the presence of the phase error is represented by a dotted characteristic curve as shown in FIG. 3A. The response of the signal system is determined by the response characteristic of the clock generating circuit 11, while that of the deflection system is determined by the response characteristic of the horizontal deflection circuit 12. As a result, the difference between these response characteristics appears in the form of a horizontal jitter on a scene being reproduced. Also, suppose that the step response of the clock signal generating circuit 11 of FIG. 2B in the presence of a phase error is represented by a dotted characteristic curve as shown in FIG. 3B. In FIG. 2B, the synchronizing signal 10 from the clock generating circuit 11 is applied as an input to the horizontal deflection circuit 12. As a result, the step response of the horizontal deflection circuit 12 of FIG. 2B is represented by a solid characteristic curve as shown in FIG. 3B, and skew included in an input signal tends to be emphasized on a scene being reproduced.

SUMMARY OF THE INVENTION

It is an object of the present invention to provide a synchronizing circuit for use in a television receiver so as to improve the response to an input video signal and to display an image of better quality even when the input signal includes skew or jitter.

The above object of the present invention is attained by provision of means for dividing the frequency of a system clock signal generated from a clock generating circuit and shaping the waveform of the resultant signal to obtain a horizontal deflection drive pulse signal applied to a horizontal deflection circuit, means for applying a flyback pulse signal generated from a flyback transformer of the horizontal deflection circuit as an input to a phase comparator in the clock generating circuit, and means for combining the clock generating circuit and the horizontal deflection circuit into a single PLL circuit.

When the frequency of a clock signal generated from a clock generating circuit is divided by a suitable frequency division factor, and the waveform of the resultant signal is shaped, this signal can act as a horizontal deflection drive pulse signal of a horizontal deflection circuit. Therefore, when such a signal is applied to actuate the horizontal deflection circuit, and a flyback pulse signal generated from a flyback transformer in the horizontal deflection circuit is applied as an input to a phase comparator in the clock generating circuit, the combination of the clock generating circuit and the horizontal deflection circuit operates as a single PLL circuit. Thus, no deviation occurs between the horizontal synchronization of the signal system provided by the clock generating circuit and the horizontal synchronization of the deflection system provided by the horizontal deflection circuit. Therefore, an adverse effect of appearance of skew or jitter on a scene being reproduced can be minimized.

According to the present invention, the clock generating circuit and the horizontal deflection circuit are incorporated in the single PLL circuit. Therefore, both the system clock signal and the horizontal deflection drive pulse signal make the same response to skew or jitter included in an input video signal, and there occurs no difference between the horizontal synchronization of the signal processing system and that of the horizontal deflection system. The present invention is advantageous in that horizontal jitter or skew is not emphasized on a scene being reproduced, and undesirable degradation of the picture quality can be minimized. The present invention is further advantageous in that the number of required parts can be considerably decreased because the clock generating circuit and the horizontal deflection circuit can be incorporated in the single PLL circuit.

DESCRIPTION OF THE PREFERRED EMBODIMENTS

A preferred embodiment of the television receiver of the present invention, when the value of n is n=2, will now be described in detail with reference to FIG. 1, in which like reference numerals are used to designate like parts of FIGS. 2A and 2B.

Figure 1:
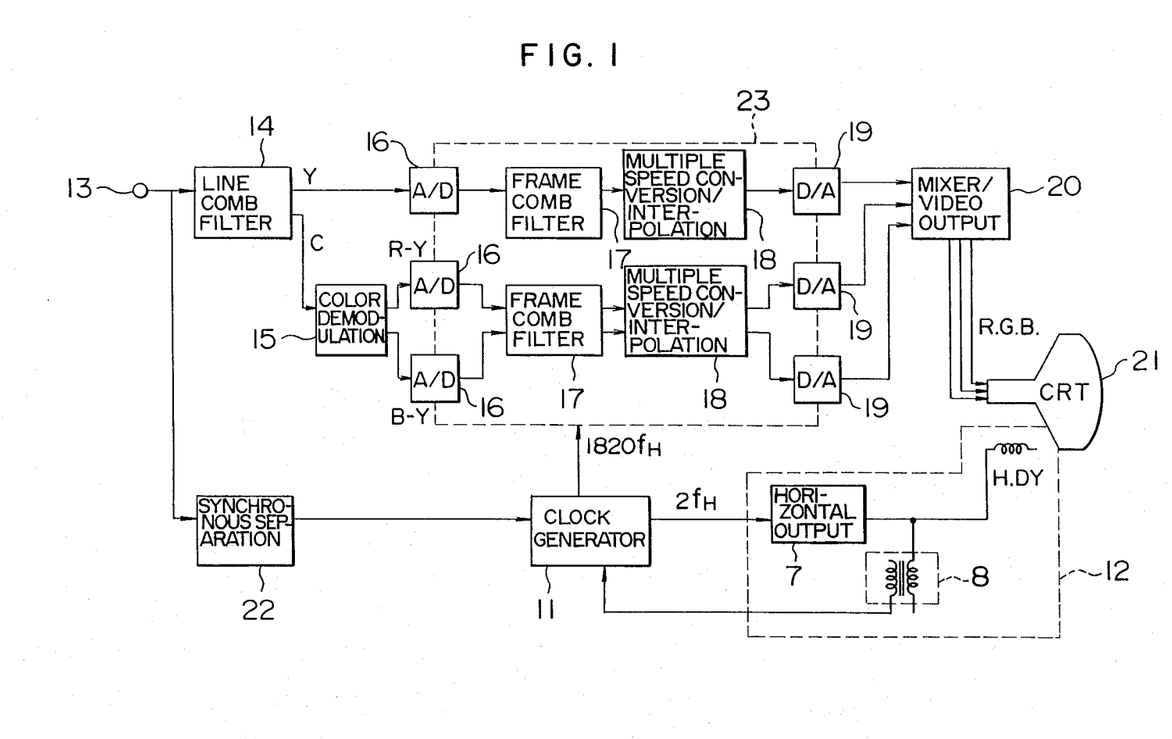
FIG. 1 is a block diagram of an embodiment of the television receiver according to the present invention.

Referring to FIG. 1, the television receiver of the present invention includes a clock generating circuit 11, a horizontal deflection circuit 12, a video signal input terminal 13, a line comb filter 14, a color demodulation circuit 15, A/D converters 16, frame comb filters 17, multiple speed conversion and interpolation circuits 18, D/A converters 19, a mixer and video output circuit 20, a cathode-ray tube 21, and a synchronous separation circuit 22.

First, the operation of the television receiver shown in FIG. 1 will be briefly described. A video signal is applied through the video signal input terminal 13 to the line comb filter 14 to be separated into a luminance signal Y and a color signal C. The color signal C is applied to the color demodulation circuit 15 to be demodulated into two color difference signals R-Y and B-Y. The luminance signal and the two color difference signals are converted into digital signals by the A/D converters 16. The digital signals are passed through the frame comb filters 17 and are then applied to the multiple speed conversion and interpolation circuits 18 to appear as multiple speed digital signals. After these digital signals are converted into analog signals by the D/A converters 19, the analog signals are converted into RGB signals by the mixer and video output circuit 20, and the RGB signals are applied to the cathode-ray tube 21.

The video signal is also applied from the video signal input terminal 13 to the synchronous separation circuit 22 in the synchronization system, and a horizontal synchronizing signal separated from the video signal is applied to the clock generating circuit 11. The clock generating circuit 11 generates a system clock signal having a frequency of $1,820f_H$ and applies the system clock signal to the digital signal processing circuit 47. A signal obtained by dividing the frequency, $1,820f_H$, of the system clock signal by the factor of 910 is applied to a horizontal output circuit 7 in the horizontal deflection circuit 12 so as to drive a horizontal DY.

Figure 4:
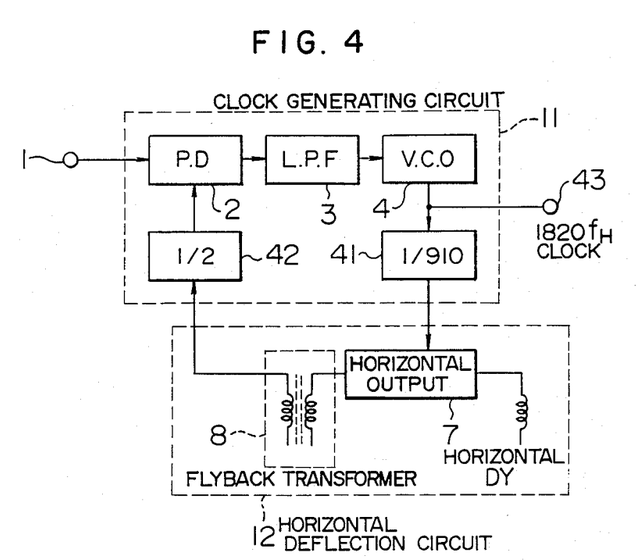
FIG. 4 is a block diagram of the synchronizing circuit used in the television receiver embodying the present invention.

FIG. 4 is a block diagram of the synchronizing circuit employed in the present invention. In FIG. 4, like reference numerals are used to designate like parts appearing in FIGS. 2A and 2B.

Referring to FIG. 4, the synchronizing circuit includes the clock generating circuit 11 which includes a horizontal synchronizing signal input terminal 1, a phase comparator (PD) 2, a low-pass filter (LPF) 3, a voltage controlled oscillator (VCO) 4, a 1/910 frequency divider 41, a ½ frequency divider 42 and a $1,820f_H$ system clock output terminal 43. The synchronizing circuit further includes the horizontal deflection circuit 12 which includes the horizontal output circuit 7 and a flyback transformer (FBT) 8.

In operation, the horizontal synchronizing signal is applied through the horizontal synchronizing signal input terminal 1 to the phase comparator 2, and the output signal of the phase comparator 2 is passed through the low-pass filter 3 to cause oscillation of the voltage controlled oscillator 4. The oscillation output signal of the voltage controlled oscillator 4 is applied as a 1,820$f_H$ system clock signal to the digital signal processing circuit 47 from the 1,820$f_H$ system clock output terminal 43. The output signal of the voltage controlled oscillator 4 is also applied to the 1/910 frequency divider 41, and a horizontal deflection drive pulse signal having a frequency of 2$f_H$ is applied from the frequency divider 41 to the horizontal output circuit 7 in the horizontal deflection circuit 12. The horizontal output circuit 7 drives the horizontal DY and also applies its output signal to the flyback transformer 8. The flyback pulse signal generated from the flyback transformer 8 is applied to the ½ frequency divider 42 in the clock generating circuit 11. The output signal of the frequency divider 42 is applied to the phase comparator 2 so that its phase coincides with that of the horizontal synchronizing signal. Thus, the system clock signal and the horizontal deflection drive pulse signal are maintained in the relation synchronous with each other because they are generated from the same PLL circuit.

Figure 5:
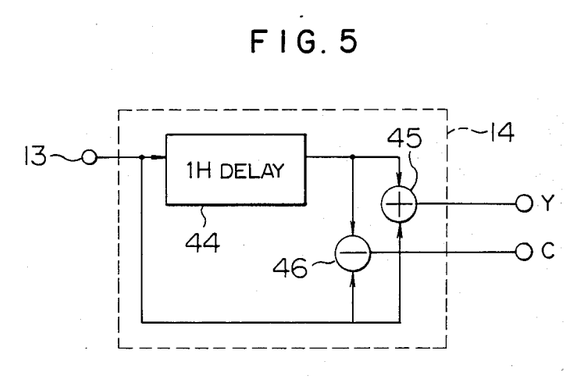
FIG. 5 is a block diagram of the line comb filter shown in FIG. 1.
Figure 6:
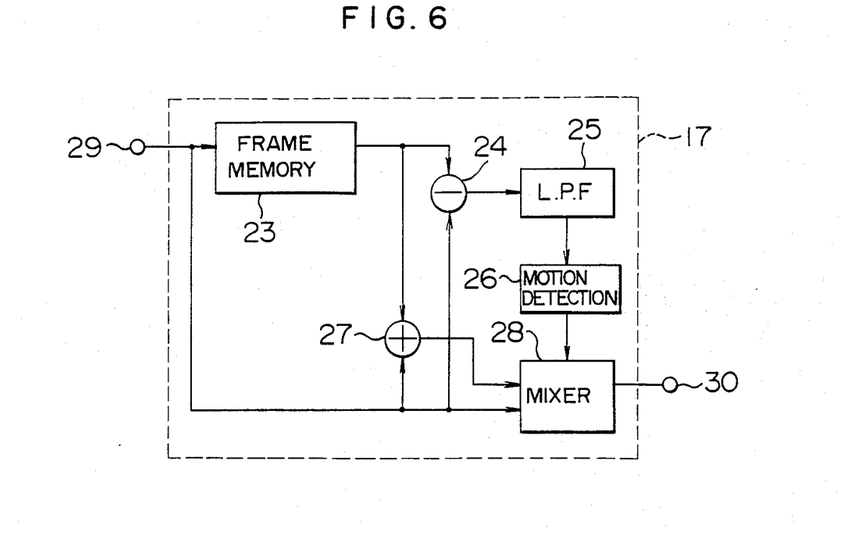
FIG. 6 is a block diagram of the frame comb filter shown in FIG. 1.
Figure 7:
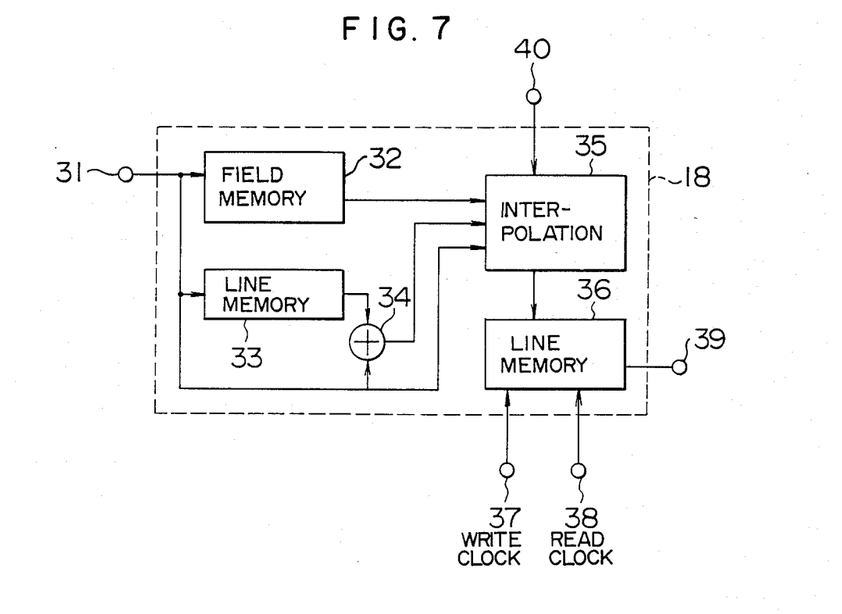
FIG. 7 is a block diagram of the multiple speed conversion and interpolation circuit shown in FIG. 1.

The structure and operation of the line comb filter 14, frame comb filter 17 and multiple speed conversion and interpolation circuit 18 will now be described in detail.

First, the structure and operation of the line comb filter 14 will be described with reference to FIG. 5. Referring to a block diagram shown in FIG. 5, the line comb filter 14 includes a 1H delay circuit 44, an adder 45 and a subtractor 46. As described already, the relation given by the equation (1) holds between the frequency $f_H$ of the horizontal synchronizing signal and hhe frequency $f_{sc}$ of the color burst signal of an input video signal when the video signal is an NTSC standard signal. Therefore, even when the input video signal is A/D converted with the timing of the system clock signal synchronous with the horizontal synchronizing signal of the input video signal, Y/C separation and color demodulation in a digital mode can be achieved. However, the input video signal is not always limited to the NTSC standard signal and may be a special video signal applied from, for example, a video cassette recorder (VCR) or a video disc player (VDP). In the case of such a video signal, there is the relation $$455/2 \cdot f_H \neq f_{sc}$$

between the horizontal synchronizing signal and the color burst signal. When such an input video signal is A/D converted with the timing of the system clock signal synchronous with the horizontal synchronizing signal so as to achieve Y/C separation in a digital mode, the Y/C separation may be incomplete or cannot be achieved in a worst case. In order that such a special input video signal can also be dealt with, the present invention employs an analog comb filter using a glass delay line to achieve Y/C separation, so that the input video signal is separated into the Y signal and the C signal before being A/D converted. That is, the line comb filter 14 employed in the present invention utilizes the fact that the phase of the color subcarrier of an input video signal is inverted at the time internal of 1H. On the basis of the above fact, a current video signal is directly applied from the signal input terminal 13 to the adder 45 to be added to a video signal applied already and delayed by the period of 1H by the 1H delay circuit 44 so as to provide the Y signal, while the difference signal between the former and latter signals is generated from the subtractor 46 to provide the C signal.

The structure and operation of the frame comb filter 17 will be described with reference to FIG. 6. Referring to a block diagram shown in FIG. 6, the frame comb filter 17 includes a frame memory 23, a subtractor 24, a low-pass filter 25, a motion detection circuit 26, an adder 27, a mixer circuit 28, a signal input terminal 29 and a signal output terminal 30.

In operation, the A/D converter output signal is applied through the signal input terminal 29 to the frame memory 23 to be delayed by the period of one frame, and such an output signal appears from the frame memory 23. The subtractor 24 generates an output signal representing the difference between the current digital signal applied directly from the signal input terminal 29 and the digital signal applied already and delayed by the period of one frame by the frame memory 23. This output signal is applied to the motion detection circuit 26 after being passed through the low-pass filter 25, and a motion detection signal appearing from the motion detection circuit 26 is applied to the mixer circuit 28. On the other hand, the current digital signal applied to the filter 17 is applied directly to the adder 27 to be added to the digital signal applied already and delayed by the period of one frame by the frame memory 23, and the resultant signal is applied also to the mixer circuit 28. In the mixer circuit 28, the output signal of the adder 27 and the current signal digital applied to the filter 17 and not delayed by the frame memory 23 are mixed at a suitable mixing ratio which is dependent on the level of the motion detection signal applied from the motion detection circuit 26. The resultant output signal of the mixer circuit 28 appears on the signal output terminal 30.

The case where the input signal is the Y signal will be first discussed. Leakage of the C signal into the Y signal provides a source of interference to the Y signal. This interference is called a dot interference in which reticulate dots flowing upward on a scene are observed at edge portions of a color display or at boundaries between colors. When the input signal applied to the television receiver is the NTSC standard signal satisfying the relation given by the equation (1), the phase of the source of dot interference in one frame of the input signal is inverted relative to that of the source of dot interference in the next adjacent frame. Therefore, when the adjacent frames of the Y signal are added to each other, the Y signal can be substantially freed from the dot interference. The effect of dot interference suppression described above is marked when the horizontal synchronizing signal and the color subcarrier in the input video signal have the relation given by the equation (1), and also when a still picture is to be reproduced. Even when the input video signal is not the NTSC standard signal, the effect of dot interference suppression is also exhibited to a certain extent, provided that the relation between the horizontal synchronizing signal and the color subcarrier is close to that given by the equation (1). On the other hand, in the case of a moving picture, there is no frame correlation between adjacent frames of the Y signal. In such a case, the subtractor 24 generates the difference between the current frame and the delayed frame of the Y signal, and the low frequency band portion of the difference signal is applied through the low-pass filter 25 to the motion detection circuit 26 which generates the motion detection signal. The adder 27 generates the sum of the current frame and the delayed frame of the Y signal. The current Y signal and the output signal of the adder 27 are mixed in the mixer circuit 28 at a suitable mixing ratio which is dependent on the level of the motion detection signal applied from the motion detection circuit 26.

The same applies to the color difference signals. Interference to the color signal is called a cross color interference in which a scene portion displaying fine oblique stripes is colored due to leakage of a high frequency band portion of the Y signal into the C signal. Primarily, in the case of a color difference signal, the phase of one frame of its color signal is the same as that of the adjacent frame, and the phase of the source of cross color interference in one frame is inverted relative to that of the source of cross color interference in the adjacent frame. Therefore, as in the case of the Y signal, the cross color interference in the color difference signal can be minimized by taking the sum of the frame signals.

The structure and operation of the multiple speed conversion and interpolation circuit 18 will be described with reference to FIG. 7. Referring to a block diagram shown in FIG. 7, the multiple speed conversion and interpolation circuit 18 includes a signal input terminal 31, a field memory 32, a first line memory 33, an adder 34, an interpolation circuit 35, a second line memory 36, a write clock input terminal 37, a read clock input terminal 38, a signal output terminal 39 and a motion detection signal input terminal 40.

In operation, the output signal of the frame comb filter 17 is applied, as a current digital signal, directly to the interpolation circuit 35 through the signal input terminal 31. The current digital signal is also passed through the field memory 32, and an output signal delayed by the period of one field appears from the field memory 32. The current digital signal is also passed through the first line memory 33, and an output signal delayed by the period of 1H appears from the first line memory 33. The current digital signal is also applied to the adder 34 together with the output signal of the first line memory 33, and an averaged output signal appears from the adder 34. The output signal of the field memory 32 and that of the adder 34 are applied to the interpolation circuit 35 as interpolation signals. In response to the motion detection signal applied to the motion detection signal input terminal 40, the current signal and interpolation signals are changed over in the interpolation circuit 35 to be selectively applied to the second line memory 36. In response to a clock signal having a frequency of $4f_{sc}$ applied to the write clock input terminal 37, data is written in the second line memory 36, and, in response to a clock signal having a frequency of $8f_{sc}$ applied to the read clock input terminal 38, data converted into a multiple speed signal is read out from the second line memory 36 to appear on the signal output terminal 39.

It will be understood from the foregoing detailed description of the present invention that both of a system clock signal and a multiple-speed horizontal deflection drive pulse signal are generated from the same single PLL circuit so that, even if an input video signal may include skew or jitter, this skew or jitter is not emphasized on a reproduced scene, and undesirable degradation of the picture quality can be prevented.

We claim:

1. A television receiver including a digital circuit processing an input video signal in a digital mode, means for scanning an electron beam at a frequency which is n times (n being an integer) as high as that of a horizontal synchronizing signal of said video signal, and a clock generating circuit applying a system clock signal to said digital circuit, said clock generating circuit comprising:
a phase comparator having a first input to which said horizontal synchronizing signal is applied;
a low-pass filter connected to said phase comparator;
a voltage controlled oscillator connected to said low-pass filter to generate the system clock signal having a frequency of $(n \times m \times f_H)$ which is $(n \times m)$ times (m being an integer) as high as the frequency ($f_H$) of said horizontal synchronizing signal;
a 1/m frequency divider dividing the frequency of said system clock signal generated from said voltage controlled oscillator by the factor of m to generate a horizontal deflection drive pulse signal having a frequency of $(n \times f_H)$; and
a 1/n frequency divider connected to a second input of said phase comparator,
said phase comparator, said low-pass filter, said voltage controlled oscillator, said 1/m frequency divider and said 1/n frequency divider constituting a single PLL circuit, and both of said system clock signal and said horizontal deflection drive pulse signal being generated from said PLL circuit.

2. A television receiver including a digital circuit processing an input video signal in a digital mode, means for scanning an electron beam at a frequency which is n times (n=1, 2, ...) as high as that of a horizontal synchronizing signal of said video signal, and a clock generating circuit applying a system clock signal to said digital circuit, said clock generating circuit comprising:
a phase comparator having a first input to which said horizontal synchronizing signal of said video signal is applied;
a low-pass filter connected to said phase comparator;
a voltage controlled oscillator connected to said low-pass filter to generate the system clock signal having a frequency of $(n \times m \times f_H)$ which is $(n \times m)$ times (n, m=1, 2, ...) as high as the frequency ($f_H$) of said horizontal synchronizing signal;
a 1/m frequency divider dividing the frequency of said system clock signal generated from said voltage controlled oscillator by the factor of m; and
a 1/n frequency divider connected to a second input of said phase comparator,
the output signal generated at the frequency of $(n \times f_H)$ from said 1/m frequency divider being applied to a horizontal output circuit of a horizontal deflection circuit as a horizontal deflection drive pulse signal, a flyback pulse signal generated from a flyback transformer of said horizontal deflection circuit being applied to said 1/n frequency divider to appear as an output signal having a frequency divided by the factor of n, and the phase of said output signal of said 1/n frequency divider being compared in said phase comparator with that of said horizontal synchronizing signal,
said phase comparator, said low-pass filter, said voltage controlled oscillator, said 1/m frequency divider and said 1/n frequency divider constituting a single PLL circuit, and both of said system clock signal and said horizontal deflection drive pulse signal being generated from said PLL circuit.

3. A television receiver including a digital circuit processing in a digital mode an input video signal including a horizontal synchronizing signal having a predetermined frequency ($f_H$), a clock generating circuit applying a system clock signal to said digital circuit, and a horizontal deflection circuit to which a horizontal deflection drive pulse signal having a frequency of ($n \times f_H$) which is n times (n being an integer) as high as that of said horizontal synchronizing signal is applied from said clock generating circuit, said clock generating circuit comprising:
- a phase comparator having a first input to which said horizontal synchronizing signal is applied;
- a low-pass filter connected to said phase comparator;
- a voltage controlled oscillator connected to said low-pass filter to generate the system clock signal having a frequency of ($n \times m \times f_H$) which is ($n \times m$) times (m being an integer) as high as that of said horizontal synchronizing signal;
- a 1/m frequency divider dividing the frequency of said system clock signal generated from said voltage controlled oscillator by the factor of m to generate the horizontal deflection drive pulse signal having the frequency of ($n \times f_H$); and
- a 1/n frequency divider connected to a second input of said phase comparator;

said horizontal deflection circuit comprising:
- a horizontal output circuit to which said horizontal deflection drive pulse signal is applied from said 1/m frequency divider; and
- a flyback transformer generating a flyback pulse signal in response to a horizontal output signal applied from said horizontal output circuit, said 1/n frequency divider dividing the frequency ($n \times f_H$) of said flyback pulse signal by the factor of n, and said phase comparator comparing the phase of the output signal generated at the frequency of $f_H$ from said 1/n frequency divider with that of said horizontal synchronizing signal, said phase comparator, said low-pass filter, said voltage controlled oscillator, said 1/m frequency divider and said 1/n frequency divider constituting a single PLL circuit, and both of said system clock signal and said horizontal deflection drive pulse signal being generated from said PLL circuit.

* * * * *